United States Patent

Eaton et al.

[19]

[11] Patent Number: 5,956,640

[45] Date of Patent: Sep. 21, 1999

[54] MESSAGING SYSTEM PROVIDING FLEXIBLE ROAMING AND METHOD THEREFOR

[75] Inventors: Eric T. Eaton, Lake Worth; David F. Willard, Plantation; William J. Kuznicki, Coral Springs, all of Fla.

[73] Assignee: Motorola, Inc., Schaumburg, Ill.

[21] Appl. No.: 08/603,966

[22] Filed: Feb. 20, 1996

[51] Int. Cl.⁶ .................................................. H04Q 7/20
[52] U.S. Cl. .......................................... 455/432; 455/524
[58] Field of Search ................................. 455/33.1, 54.1, 455/56.1, 54.2, 89, 38.2, 32.1, 70, 517, 524, 38.4; 379/58, 59, 57; 340/825.44, 825.52

[56] References Cited

U.S. PATENT DOCUMENTS

| | | | |
|---|---|---|---|
| 4,178,476 | 12/1979 | Frost . | |
| 4,718,109 | 1/1988 | Breeden et al. | 455/51 |
| 4,989,230 | 1/1991 | Gillig et al. | 379/59 |
| 5,119,397 | 6/1992 | Dahlin et al. | 379/59 |
| 5,168,493 | 12/1992 | Nelson et al. | 370/84 |
| 5,254,986 | 10/1993 | DeLuca | 340/825.44 |
| 5,475,863 | 12/1995 | Simpson et al. | 455/56.1 |
| 5,535,424 | 7/1996 | De Seze et al. | 455/56.1 |
| 5,546,394 | 8/1996 | Eaton et al. | 370/79 |
| 5,548,631 | 8/1996 | Krebs et al. | 455/53.1 |
| 5,550,895 | 8/1996 | Burson et al. | 379/59 |
| 5,551,061 | 8/1996 | Schwendeman | 455/56.1 |

*Primary Examiner*—Reinhard J. Eisenzopf
*Assistant Examiner*—Sam Bhattacharya
*Attorney, Agent, or Firm*—Pablo Meles; Philip P. Macnak

[57] ABSTRACT

A message transmission system (100) and method for providing flexible roaming to a receiving device (126) which includes a code memory (422) which stores addresses of a first type (1202) to enable reception of messages within a local geographic area, and an address of a second type (1214) to enable reception of the messages within a different geographic area. The message transmission system (100) includes a transmitter (SSID1) which transmits the addresses of the first type with the messages associated therewith within the local geographic area, and a controller (204) which controls conversion of the addresses of the first type to the address of the second type, and transfer of the address of the second type with the messages associated with the addresses of the first type to a transmitter (SSID2-SSID5) which transmits the address of the second type with the messages associated therewith to the receiving device when operating within the different geographic area.

18 Claims, 11 Drawing Sheets

FIG. 5

| 1 | 2 | 3 | 4 | 5 | 6 | 7 | . . . . . . . . . . | 21 | 22 . . . . . . . . . . . 31 | 32 |
|---|---|---|---|---|---|---|---|---|---|---|
| x0 | x1 | x3 | x3 | c0 | c1 | c2 | c3 f0 f1 f2 f3 f4 f5 f6 n0 r0 t0 t1 t2 t3 | | PARITY  p p p p p p p p p p | CK p |
| 0 | 0 | 1 | 1 | 1 | 1 | 0 | 0 0 0 1 1 1 0 0 0 0 0 0 1 | | | |

FIG. 6

| 1 | 2 | 3 | 4 | 5 | 6 | 7 | . . . . . . . . . . | 21 | 22 . . . . . . . . . . . 31 | 32 |
|---|---|---|---|---|---|---|---|---|---|---|
| x0 | x1 | x2 | x3 | P0 | P1 | P2 | P3 a0 a1 v0 v1 v2 v3 v4 v5 c0 c1 m0 m1 m2 | | PARITY  p p p p p p p p p p | CK p |
| 0 | 1 | 0 | 1 | 0 | 1 | 0 | 1 0 0 1 1 1 1 0 0 1 | | | |

FIG. 7

| 1 | 2 | 3 | 4 | 5 | 6 | 7 | . . . . . . . . . . | 21 | 22 . . . . . . . . . . . 31 | 32 |
|---|---|---|---|---|---|---|---|---|---|---|
| x0 | x1 | x2 | x3 | f0 | f1 | f2 | s0 s1 s2 s3 s4 s5 s6 s7 s8 s9 s10 s11 s12 s13 | | PARITY  p p p p p p p p p p | CK p |
| 1 | 1 | 0 | 1 | 1 | 0 | 0 | 1 0 1 0 0 1 1 1 1 0 0 1 | | | |

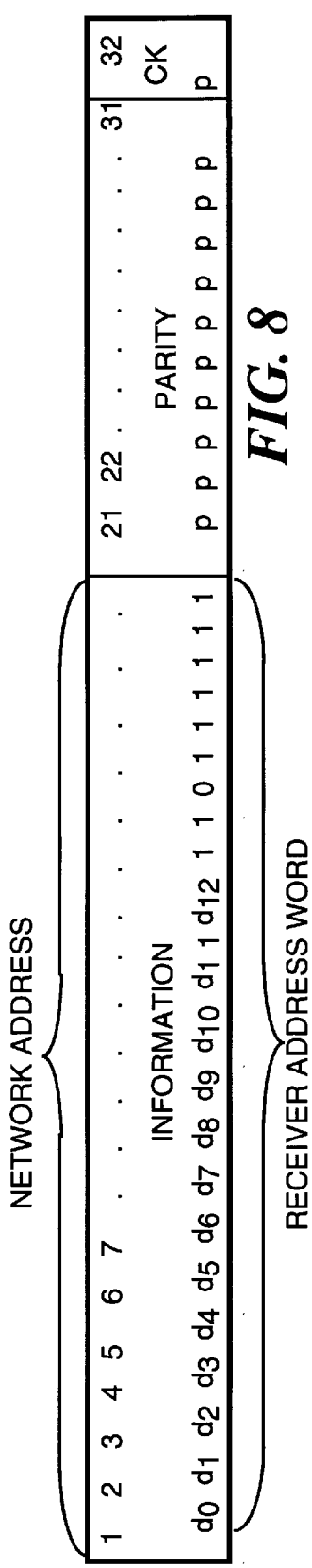
FIG. 8
FIG. 9
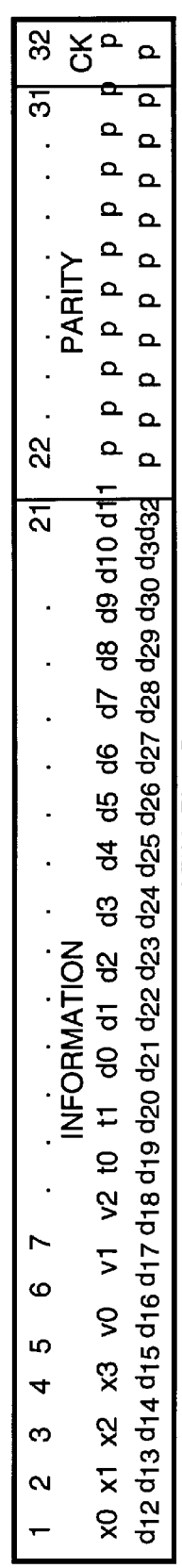
FIG. 10
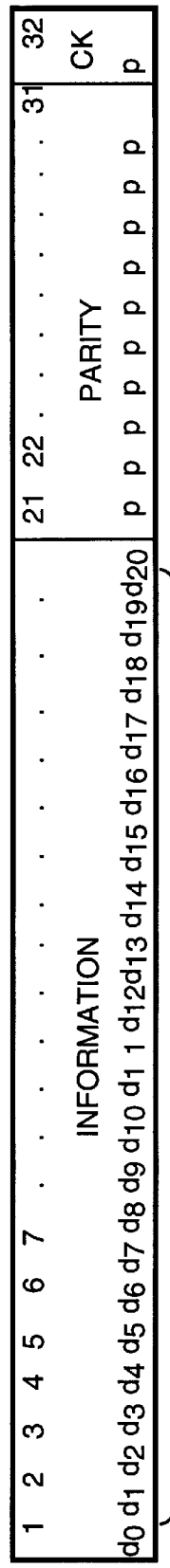
FIG. 11
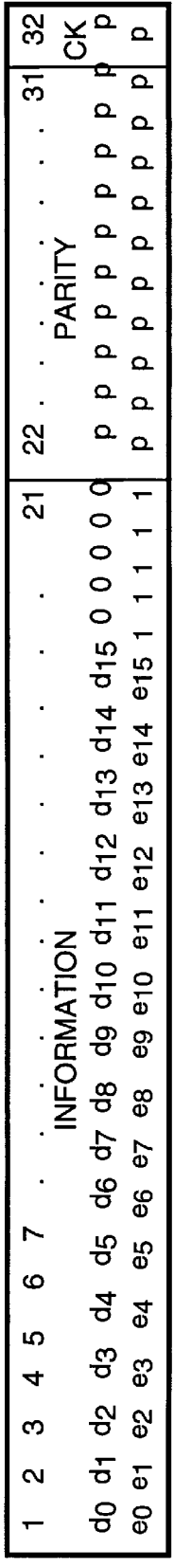

| USER | LOCAL PERSONAL ACCESS NUMBER | PERSONAL ADDRESS | LOCAL GROUP ACCESS NUMBER | GROUP ADDRESS | TYPE | A/I | ROAMING ADDRESS | TRANSMISSION ATTRIBUTES | ROAM FLAG | ALTERN. NETWORK ID |
|---|---|---|---|---|---|---|---|---|---|---|
| 1 | (407)XXX-1234 | PA1-U1 | (407)XXZ-1567 | GA-U1 | A | | PA1-U1 | FR7/01/C0/TF1 | 0 | |
| 2 | (407)XYZ-1237 | PA4-U2 | (407)XXZ-1567 | GA-U1 | A | | PA4-U2 | FR1/02/C4/TF3 | 0 | |
| 3 | (407)XXY-1021 | PA1U3 | | | A | | PA1U3 | FR16/03/C2/TF0 | 0 | |
| 3 | (407)XXY1022 | PA2-U3 | | | A | | PA2-U3 | FR16/03/C2/TF2 | 1 | SSID1 |
| 4 | (407)XXY-1021 | PA1-U4 | | | A | | PA1-U4 | FR8/04/C0/TF0 | | |
| 4 | (407)XXY-1024 | PA4U4 | | | A | | PA4U4 | FR8/04/C0/TF0 | | |
| N | (407)ZYX-5555 | PA1-UN | (407)XXZ-1567 | GA-UN | | I | PA1-UN | FR24/02/C0/TF1 | 1 | NID1SA5 |

208

| SYSTEM NAME | LOCATION | ADDRESS TYPE | NETWORK ID | TNPP ADDRESS |
|---|---|---|---|---|
| FAST-PAGE | ATLANTA | C | SSID1CZ10 | FP.COM.ATL |
| SURE-BEEP | CHICAGO | NON-C | NID1SA5 | SB.COM.CHI |
| SURE-BEEP | WALLA-WALLA | NON-C | NID1SA3 | SB.COM.WALLA |

MESSAGING SYSTEM PROVIDING FLEXIBLE ROAMING AND METHOD THEREFOR

FIELD OF THE INVENTION

This invention relates in general to radio communication systems, and more specifically to a method and apparatus for providing flexible roaming capability for a receiving device operating within a radio communication systems.

BACKGROUND OF THE INVENTION

Communication systems are available which provide service over a wide area, such as nationwide or even globally. Such wide area systems are made up of numerous local area systems which provide service to a particular geographic area, such as a city or region encompassing a group of cities. Such wide area systems often operate on numerous radio communication frequencies and require that a communication receiver that is allowed to roam between the local area systems be capable of scanning the numerous frequencies in order to identify one or more frequencies designated to carry messages directed to the communication receiver.

Depending upon the grade of service required by a subscriber, the communication receiver carried by the subscriber will be assigned to a home system which provides coverage within the local geographic area, or region, in which the subscriber is predominantly located, and will be assigned one or more addresses to enable message delivery from a variety of sources. In some instances, the messages which are being delivered are directed to a group of subscribers, in which case the communication receiver will be assigned a group address.

Early wide area communication systems required the addresses which are assigned to the communication receivers to be coordinated, which, depending upon the signaling protocol utilized to deliver the messages greatly limited the number of subscribers which could roam from one region to another.

The address limitation was improved in another prior art wide area communication system, by appending a system ID to each individual address assigned to the communication receiver, thereby creating a number of long addresses which corresponded one for one to the number of individual addresses assigned to each communication receiver. In this system, addresses assigned locally could be reassigned to other communication receivers operating locally in other geographic areas. The long addresses had to be transmitted in batches independent of the regular addresses in order to prevent false address detection by another local area communication receiver.

With the advent of higher speed paging protocols, it is apparent that the paging user is expecting to receive more information services and other group messages in addition to traditional personal paging services. As regional and global roaming become commonplace, the paging user will expect the services available in his local coverage area to be forwarded to him as he roams. This increasing traffic per user and the growth of roaming services in general will result in the service provider focusing the roaming traffic into only the coverage areas requested by the traveler thus maximizing the channel capacity of the total roaming infrastructure. Focused roaming complicates the networking aspects of the infrastructure over the past tendency to send roaming traffic into areas much larger than the actual coverage required by the roaming subscriber. It also complicates the pager operation especially in the areas between two coverage areas where the pager does not know which signal is carrying its traffic.

Thus, what is needed is a method and apparatus that provides flexible roaming capability to a receiving device operating within a radio communication systems.

BRIEF DESCRIPTION OF THE DRAWINGS

FIG. 5 is a diagram illustrating a structure of a frame information word according to the present invention.

FIGS. 6 and 7 are diagrams illustrating structures of block information words in which single Simulcast System Identification (SSID) information is coded.

FIGS. 8 and 9 are diagrams illustrating structures of an address word and a vector word, respectively, in which roaming Network IDentification (NID) information is coded in accordance with the present invention.

FIG. 10 is a diagram illustrating the structure of a single word, or short, address.

FIG. 11 is a diagram illustrating the structure of a two word, or long, address.

FIG. 14 is a diagram depicting a subscriber data base and a network data base in accordance with the present invention.

DETAILED DESCRIPTION OF THE DRAWINGS

Figure 1:
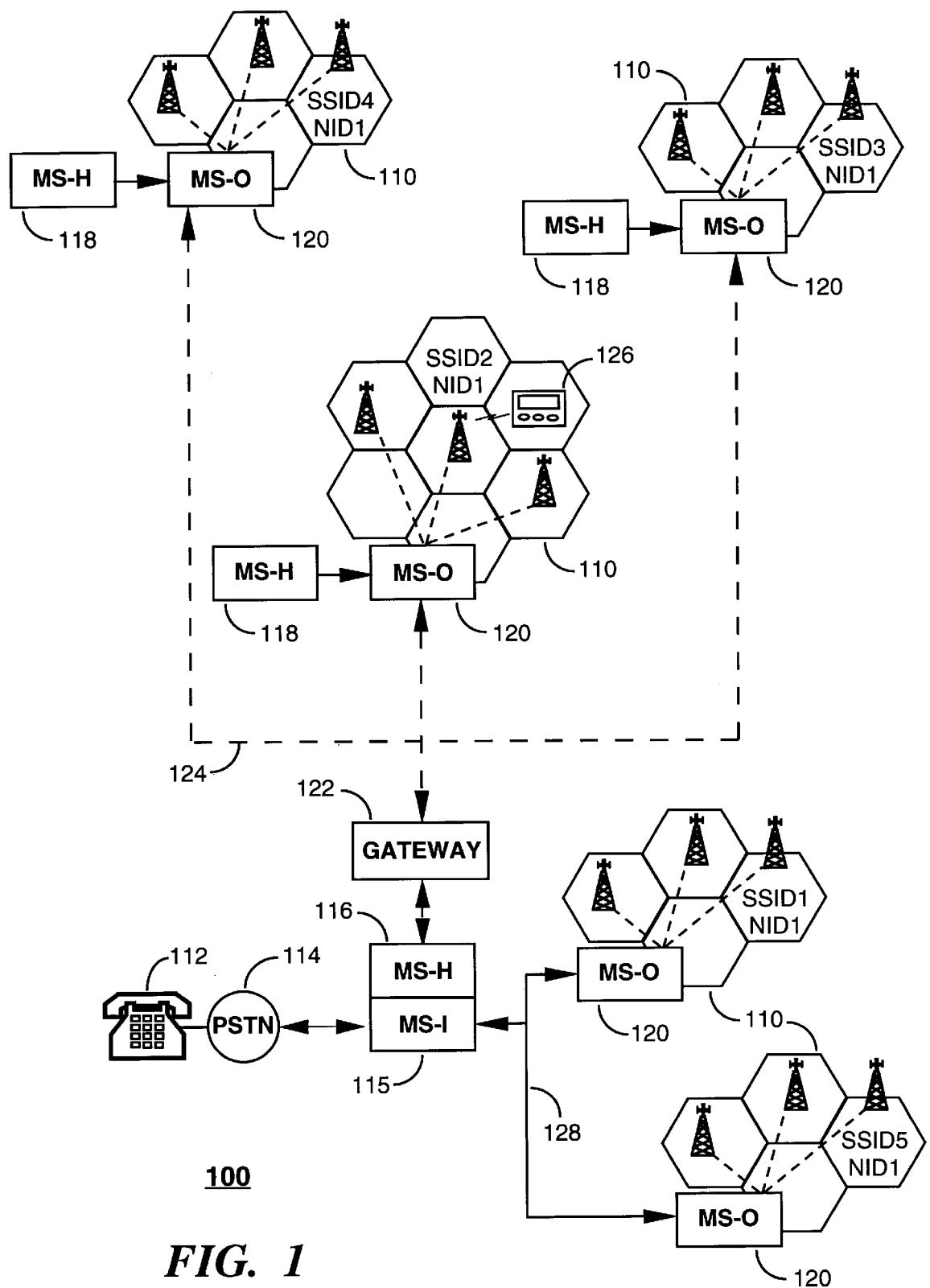
FIG. 1 is a diagram of a wide area communication system providing roaming capability for a receiving device in accordance with the present invention.

FIG. 1 is a block diagram of a message transmission system, and in particular a wide area communication system 100, such as a nationwide paging system, providing flexible roaming capability for a receiving device 126, such as paging receiver, a data communications receiver or an information services receiver, in accordance with the present invention. The wide area system 100, encompasses a wide geographic area which by example can be a nationwide communication system comprising numerous local area systems operating on one or more local area radio frequency channels which are identified as simulcast transmission zones 110 which provide service to a local geographic area, such as a city (SSID1–SSID5) or a region encompassing a group of cities (NID1). All receiving devices are assigned to a home system which operates on a home radio frequency channel. Messages directed to a receiving device 126 can be originated using a telephone 112, or other message entry device in a manner well known to one of ordinary skill in the art. A caller's message, originated via the telephone 112 is directed through the public switched telephone network 114 (PSTN) to a Messaging System-Input (MS-I) 115, such as an MPS 2000 input processor manufactured by Motorola Inc. of Schaumburg, Ill., and which is a paging network node used to receive messages from the external network, such as the PSTN, a PSDN, or a LAN (local area network), just to name a few. The MS-I 115 couples to a Messaging System-Home (MS-H) 116, such as an MPS 2000 central processor manufactured by Motorola Inc. of Schaumburg, Ill., and which is a paging network node that houses subscriber database records and the like for a subscriber, as will be described in further detail below. The MS-I 115 and the MS-H 116 are often combined and are referred to as a paging terminal, such as a WMG-Administrator! manufactured by Motorola Inc. of Schaumburg, Ill. The MS-H 116, or a paging terminal, hereinafter refereed to as a paging terminal 116, processes the message, as will be described below, and sends the processed message to one or more Messaging System-Outputs 120, hereafter referred to as output controllers 120, such as a CNet Controller, an MPS 2000 output processor or an RF-Conductor! each of which is manufactured by Motorola Inc. of Schaumburg, Ill., and which are paging network nodes that generate the encoding of the information needed to both manage the RF channel, and to manage the base stations utilized to transmit messages within the local area system (in this instance identified by SSID1 and SSID5) for reception by a receiving device operating within the local area system. The paging terminal 116 communicates to the output controllers 120 using any one of a number of well known communications links 128, such as through the public switched telephone network, or via a radio frequency, microwave or satellite communication link.

When a communication receiver, such as a receiving device 126, roams from the Home System to another local area system, the messages are forwarded to that local area system. The forwarding of the message can be through the public switch telephone network 114, or can be accomplished using one of the well known wide area data transmission networks 124. The paging terminal 116 communicates to the wide area data transmission networks 124 through a message gateway 122, which is a processor that is used to translate from one network to another, in a manner well known to one of ordinary skill in the art. Each of the other local area systems has a paging terminal 118, as described above, which processes messages, and which are generated from within the local area system as well as messages received over the wide area data transmission networks 124.

Within each local geographic area 110, receiving devices are individually assigned an address or a group of addresses identifying the receiving device for which message transmissions are directed. The addresses can be assigned using any one of a number of well known signaling protocols, such as the FLEX™ signaling protocol to be described below. When addresses are assigned to the receiving devices, the addresses may be coordinated, i.e. assigned such that individual addresses are not repeated in other local geographic areas, or the addresses may be uncoordinated, i.e. assigned such that individual addresses may be repeated in one or more other local geographic areas. Typical signaling protocols do not generally provide a sufficient number of addresses such that addresses can be coordinated throughout all of the local area systems of a nationwide, or global system. The assignment of multiple addresses to an individual communication receiver, as well as the assignment of group call addresses, i.e. addresses which are assigned to a group of communication receivers, further complicates coordinating address assignments between local geographic areas, as will be described in further detail below.

While only paging terminal 116 is shown as communicating with of local area systems through a gateway 122, it will be appreciated that each of the paging terminals 118 can also communicate to the MS-O 120 of the Home System.

Figure 2:
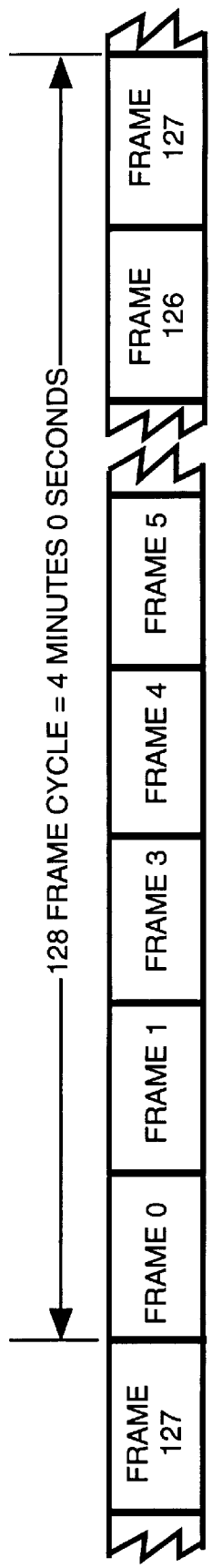
FIGS. 2–4 are timing diagrams illustrating a signaling protocol in accordance with the present invention.
Figure 3:
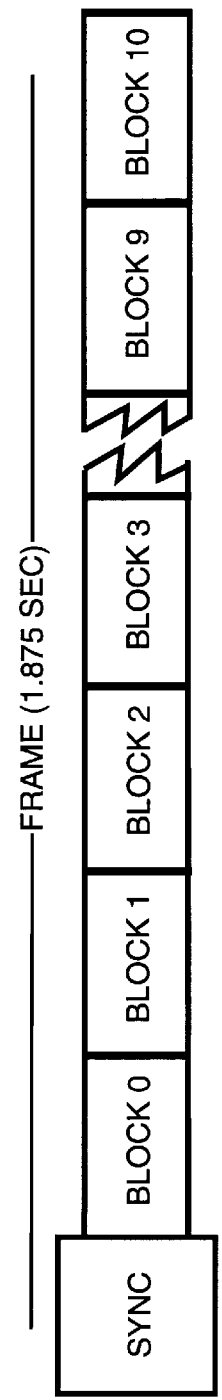
Figure 4:
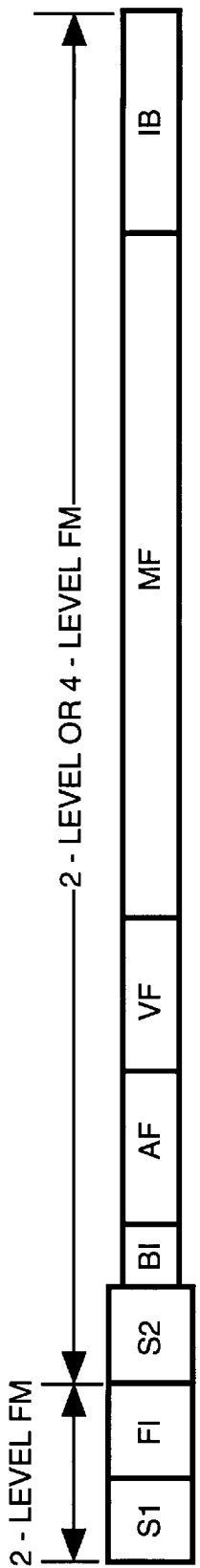

FIGS. 2–4 illustrate a signaling protocol, such as the FLEX™ signaling protocol, which is suitable for use with the present invention. The signaling system shown in FIG. 2 comprises 128 frames, with each frame numbered 0 to 127. The frames are transmitted at 32 frames per minute, and thus a full 128 frame cycle lasts 4 minutes. One hour is divided into 15 cycles numbered 0 through 14. The protocol is a synchronous time slot protocol which can be tied to a universal time reference. Frame 0 is typically synchronized to the start of each hour so that the receiver can derive real time from the current frame and cycle number, thus providing the receiver accurate time within the hour with no need for adjustment.

Moreover, the protocol supports multiple time division multiplexed "phases", wherein for example, a 6400 bits per second (bps) data stream is time division multiplexed into four data streams of 1600 bps. Such a signaling structure is disclosed in commonly assigned U.S. Pat. No. 5,168,493. Thus, the general frame structure shown in FIG. 2 represents a single phase, and is the same throughout each of four phases.

Each frame comprises a sync portion and several blocks as shown in FIG. 3. The sync portion further comprises a Sync 1 portion (S1), a frame information (FI) word and a Sync 2 portion (S2), as shown in FIG. 4.

Each receiver, such as receiving device 126, is assigned a base frame in the set of 128 frames appearing on an radio frequency (RF) channel. A receiver can trade battery life for the more frequent delivery of messages by being assigned to monitor more than one frame per cycle. Once a receiver acquires synchronization to the RF channel, the receiver expects to find its assigned frame within a very tight time window. The use of 4-level FM doubles the data transmission rate per symbol (as compared to 2-level FM) which helps to reduce the effect of simulcast distribution errors and the effect of propagation timing differences between multiple signals within the capture range of the receiver.

As shown in FIG. 4, the Sync 1 (S1) portion of each frame provides for frame timing, symbol timing and indicates the speed of the remainder of the frame. The frame information (FI) word carries 11 bits for the frame and cycle numbers, 5 bits to indicate a time diversity system or in a conventional FLEX™ system, to indicate phases of low traffic, 1 bit called a Roaming Support Bit to indicate the presence of a frequency carrying roaming traffic and which is preferably GPS aligned to deliver messaging and other information. The Roaming Support Bit is used to trigger recognition of certain network roaming information which will be described below.

The Sync 2 (S2) portion provides for synchronization at the frame's block speed to allow for proper de-multiplexing and decoding of the blocks.

The Block Information (BI) field is the first 1–4 words, called block information words, of the first interleaved block (B0) and contains frame and system structure information, some of which is pertinent to the present invention and is explained in greater detail hereinafter.

The address field (AF) starts directly after the block information words and consists of short addresses and long addresses, as will be described below. The vector field (VF) maintains a 1 to 1 relationship with the address field. The vector word points to the start word of the associated message. The message field (MF) contains the message words specified by the vector field. IB represents idle blocks which are unused and are filled with appropriate bit patterns.

FIG. 5 illustrates the structure of the frame information word in greater detail. The various parameters in the frame information word are defined as follows:

c Cycle Number (0–14) $c_3c_2c_1c_0$ 15/hour f Frame Number (0–127) $f_6f_5f_4f_3f_2f_1f_0$ 128/cycle n Roaming Support Bit n=1 indicates network support for roaming and n=0 indicates no network support for roaming r Time Diversity Paging System
    If r=1, $t_3t_2t_1t_0$ are reserved to indicate a repeat format exists
    If r=0, $tt_3t_2t_1t_0$ are Low Traffic flags for each phase in a frame t Definition dependent on value of "r"
    At 3200 bits/sec t3=t2 and t1=t0 representing two phases in the frame
    At 1600 bits/sec t3=t2=t1=t0 representing one phase in the frame
    t=1 Indicates address field contained in block 0
    t=0 Indicates address field extends past block 0

These flags give early indication that the traffic is light and all addresses are contained within block 0.

x Standard 4 bit Check Character

FIG. 6 illustrates an example of block information word 1. Block information word 1 has 2 "a" bits, a0a1, which indicate the start of the address field, 6 "v" bits v5v4v3v2v1v0 which define the start of the vector field, 2 "c" bits c1c0 which indicate traffic overflow into the next frame(s), 3 "m" bits m0m1m2 which indicate the number of high order frame number bits to be masked and 4 "P" bits P3P2P1P0, which indicate the number of priority addresses at the beginning of the address field.

FIG. 7 illustrates an example of block information words 2, 3 and 4. Word Format Type is represented by format bits f2f1f0, s represents the data and x again is the standard 4 bit Check Character.

Below is a table which illustrates the bit pattern definitions for the f and s bits shown in FIG. 7. Depending on the values of bits f2f1f0, the data bits s13–s0 have a particular meaning or application. When f2f1f0 is set to (000), bits s13–s0 represent a 9 bit local identification (LID) number (i8-i0) which identifies 512 possible LIDs, and a 5 bit Coverage Zone number C4C3C2C1C0, which represents 32 possible Coverage Zones associated with a particular LID.

| $f_2$ | $f_1$ | $f_0$ | $s_{13}s_{12}s_{11}s_{10}s_9s_8s_7s_6s_5s_4s_3s_2s_1s_0$ | |
|---|---|---|---|---|
| 0 | 0 | 0 | $i_8i_7i_6i_5i_4i_3i_2i_1i_0C_4C_3C_2C_1C_0$ | 512 Local, IDs, 32 Coverage Zones |
| 0 | 0 | 1 | $m_3m_2m_1m_0d_4d_3d_2d_1d_0Y_4Y_3Y_2Y_1Y_0$ | Month, Day, Year |
| 0 | 1 | 0 | $S_2S_1S_0M_5M_4M_3M_2M_1M_0H_4H_3H_2h_1H_0$ | Sec., Min., Hr. |
| 0 | 1 | 1 | Reserved for Future Use | |
| 1 | 0 | 0 | Reserved for Future Use | |
| 1 | 0 | 1 | $I_9I_8I_7I_6I_5I_4I_3I_2I_1I_0A_3A_2A_1A_0$ | System Information, Type |
| 1 | 1 | 0 | Reserved for Future Use | |
| 1 | 1 | 1 | $c_9c_8c_7c_6c_5c_4c_3c_2c_1c_0T_3T_2T_1T_0$ | Country Code, Roaming Traffic Flags |

When f2f1f0 is set to (001), the data bit pattern s13–s0 represents month, day, and year information. When f2f1f0 is set to (010), the data bit pattern s13–s0 represents second, minute, and hour information. When f2f1f0 is set to (101), data bits s13–s4 represent system information, and data bits s3–s0 represent the type.

Finally, of importance is the f2f1f0 bit pattern (111), which indicates a 10 bit Country Code c9–c0 and 4 bits called Traffic Splitting Flags T3–T0, both of which will be described in more detail hereinafter.

The Country Codes follow, for example, the CCITT Standard ITU-T Standard E.212 Annex A which is well known in the art. The 10-bit Country Code is provided to permit reuse of LIDs in different countries, following the CCITT standard assignment rules. Country Code information is useful by the non-subscribing receiver to facilitate a more efficient scan search by first identifying in what country the receiving device is located.

In the example shown in FIG. 1, there are 512 possible LIDs, each with 32 possible Coverage Zones. A Coverage "Zone" is a single simulcast area which may be associated with other simulcast areas in a coverage area through a common LID. For example, a service provider is given LID 011011101XXXXX. The service provider has the option to assign this LID to 32 different divisions of a coverage area or Coverage Zone. The northern part of a service provider's coverage area may be Zone 1 and would transmit 01101110100001, whereas a southern part is Zone 2 and transmits 01101110100010.

The Traffic Splitting Flags T3–T0 indicate the assignment of 4 groups of roaming traffic to a frequency (channel). Each roaming receiver such as the receiving device 126, which finds a frequency to carry a valid LID responds to only one of the 4 Traffic Splitting Flags. When a receiver's assigned flag is equal to 0, the receiver searches for another frequency with the same LID and the assigned flag set equal to 1.

The SSID information is coded into two words:
    1st Word (000) 9 bits=512 LIDs
        5 bits=32 Coverage Zones
    2nd Word (111) 10 bits=1024 Country Codes
        4 bits=Traffic Splitting Flags The 1st Word, called LID1 hereinafter, corresponds to the first block information word (000) referred to in FIG. 4, and the 2nd Word, called LID2, corresponds to block information word (111).

Time and calendar information (block information words f2f1f0=001, 010 and 101) when transmitted, are defined to occur in frame 0, or otherwise in the first valid frame following frame 0. In a roaming capable system, the LID together with the Coverage Zone, Country Code and Traffic Splitting Flags occupy the second and third block information words in frame 0. The fourth block information word carries the three available time and calendar information words and is sent in the fourth block information word position in frame 0 in a rotating sequence, one block information word at a time over 3 consecutive cycles. This allows the block information words in 001, 010 and 101 to be updated 5 times each hour.

An advantage of this scheme is that these messages are delivered without addresses. System information is used to attach a vector and message to it.

Bits A3–A0 define the type of System message and a class of receiver for which it is intended, as shown in the table below. As an example, all receivers should look at this message, only receivers which are using SSID frequency information should look at this message, and/or only receivers which are using roaming Network IDentification (NID) to be described hereinafter to lock to this channel should look at this message. Also instructions on which frequency to go to when a Traffic Splitting Flag is hanged, and time zone information can be sent.

| A3 | A2 | A1 | A0 | |
|---|---|---|---|---|
| 0 | 0 | 0 | 0 | All message |
| 0 | 0 | 0 | 1 | Local message |
| 0 | 0 | 1 | 0 | Roam message |
| 0 | 0 | 1 | 1 | Roam Instruction |
| 0 | 1 | 0 | 0 | Time Zone |
| **** | | | | |
| 1 | 1 | 1 | 1 | Reserved for future use |

When a system message is indicated, an additional vector is added to the end of the vector field. A receiver decodes the corresponding block information and determines instruction type and which receivers should look at the message associated with this block information word. After the receiver has determined that it should look at the message it processes the address field and vector field as normal but there will be an additional vector at the end of the vector field. Only the receivers which are instructed to look for a message will look at this vector because all the address/vector combinations will point at message words that are located after this vector which is actually in the location of the first message word for the message field. Up to this point, a certain group of receivers have been informed that there is a message, what type of message to expect, and where to look for this message. Once the receiver enters the message field it decodes the message and handles it according to the message type.

An example of a system message is a greeting message transmitted to a receiver which is roaming into a coverage area outside of its home coverage area.

Another example of the utility of a system message is in connection with the Traffic Splitting Flags. When a service provider has two systems which have the same coverage area (i.e., redundant systems) or overlapping portions of coverage areas, and would like to move traffic from one of the systems to another, the following process is performed.

A system message as described above is sent out informing the receiver that there is going to be a traffic change and the traffic change information to a new frequency XXXXXX. The receiver adds this new frequency to its scan list. The receiver should move to XXXXXX frequency and look for an assigned SSID or NID on this new frequency. In a later transmission, which could be one month later or it could be 1 minute later, the Traffic Splitting Flag is unset on one frequency and set on the other redundant coverage area system. The receiver detects that roaming traffic for the receiver is no longer supported on this channel and moves to the frequency it was instructed to go to by the message. Once there, the receiver determines if the SSID or NID and Traffic Splitting Flag is set correctly. When the SSID or NID information stored in the receiver match the corresponding transmitted information, the receiver stays on the frequency (and adds this frequency to its scan list). When a match is not made, the receiver will go back to the frequency it was originally on to make sure that it was not a mistake. When that frequency no longer supports the receiver's roaming traffic, the receiver will start looking on its own (scanning the band) for an SSID or NID match.

Another way to handle traffic splitting is for the system to unset the Traffic Splitting Flag and let the receiver find a new system transmitting that receiver's SSID or NID.

It should be understood from the foregoing that the same LID and Coverage Zone values may be used by the same provider or other providers on other channels.

FIGS. 8 and 9 illustrate the manner in which the NID is encoded in the signal transmitted in each Service Zone. FIG. 8 illustrates a network address, of which twelve bits d0–d11 of the twenty-one bits d0–d20 define, as an example, 4096 network addresses or network IDs. FIG. 9 illustrates a short instruction vector which provides an address multiplier comprising an additional twelve address bits, as described below.

FIG. 9 illustrates the vector word structure associated with the address word of FIG. 8. The table below gives the bit definitions associated with the vector word of FIG. 9.

| $t_1$ | $t_0$ | $d_{11}d_{10}d_9d_8d_7d_6d_5d_4d_3d_2d_1d_0$ | |
|---|---|---|---|
| 0 | 0 | $c_3c_2c_1c_0b_3b_2b_1b_0a_3a_2a_1a_0$ | -3 Numeric Characters with Shore Address or 8 Numeric Characters with Long -Add |
| | | $F_3F_2F_1F_0M_2M_1M_0A_4A_3A_2A_1A_0$ | or 12 bits usable for Network Address |
| 0 | 1 | $s_8s_7s_6s_5s_4s_3s_2s_1s_0S_2S_1S_0$- | 8 Sources plus 9 or 30 Unused Bits |
| 1 | 0 | $s_1s_0R_0N_5N_4N_3N_2N_1N_0S_2S_1S_0$ | 8 Sources, 0–63 Message Number, Message Retrieval Flag, and 2 or 23 Unused bits |
| 1 | 1 | | Spare Message Type |

Bits V0V1V2 are used to specify the vector type, such as numeric, tone-only, etc. When the V0V1V2 are set to a value corresponding to a particular type, such as short message/tone only, this signifies that the 12 bits d0–d11 specify a Service Area, Traffic Splitting Flags and Network multiplier. For example, A0–A4 define the Service Area (32 possible)

M0–M2 are the Traffic Splitting Flags and F0–F3 are Network multiplier bits. The Network multiplier bits allow for 8 times 4096 more unique NIDs.

FIG. 10 is a diagram illustrating the structure of a single word, or short address. One or more single word addresses are assigned to a receiving device, and the addresses can be coordinated between local area systems or non-coordinated between the local area systems, as described above. When multiple short addresses are assigned, one of the addresses is designated a primary address, as will be described in detail below.

Figure 12:
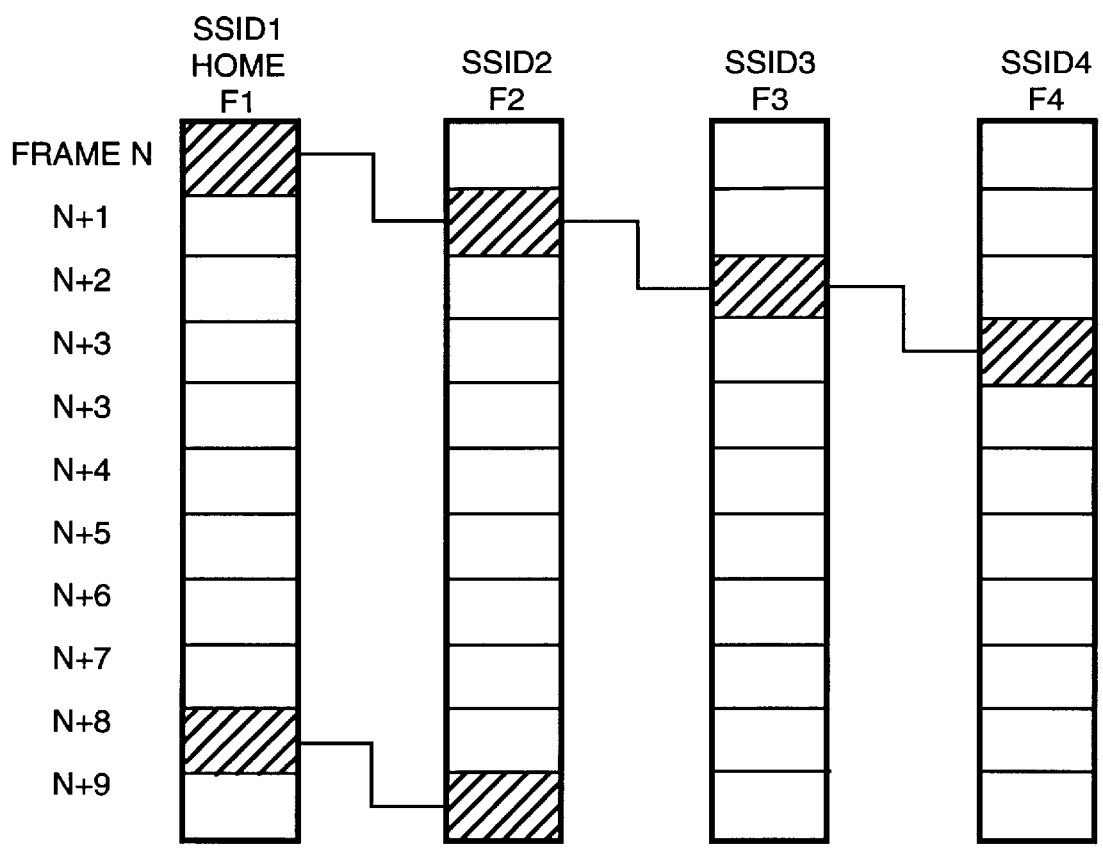
FIG. 12 is frame diagram illustrating a reception pattern for multiple frequency channels allowing the receiving device to monitor several channels in accordance with the present invention.

FIG. 11 is a diagram illustrating the structure of a two word, or long address. The long address provides approximately five billion addresses, and, when assigned to roaming receiving devices, are coordinated between local area systems. Address coordination is overseen by an organization such as the Personal Communications Industry association (PCIA), The long address is designated a primary roaming address which enables the receiving device to receive messages directed to any of its short addresses, as will be described in detail below FIG. 12 illustrates a frame offset mechanism which enables a receiver to scan frequencies in every frame which are offset from its home frame as indicated. This frame offset method is useful in situations where a receiver is straddling an area where there is two or more possible matching frequencies in the same coverage area. In order that a match on any of the possible frequencies can be achieved, for each frequency of which coverage is desired, a frame is chosen in which the receiver can match SSID information, which is different from the frames for the other frequencies. For example, as shown in FIG. 12, the frame chosen in each frequency is offset by one frame. Other frames could also be chosen. Consequently, the receiver is able to detect all SSID's since each is assigned to a different frame in the cycle.

Figure 13:
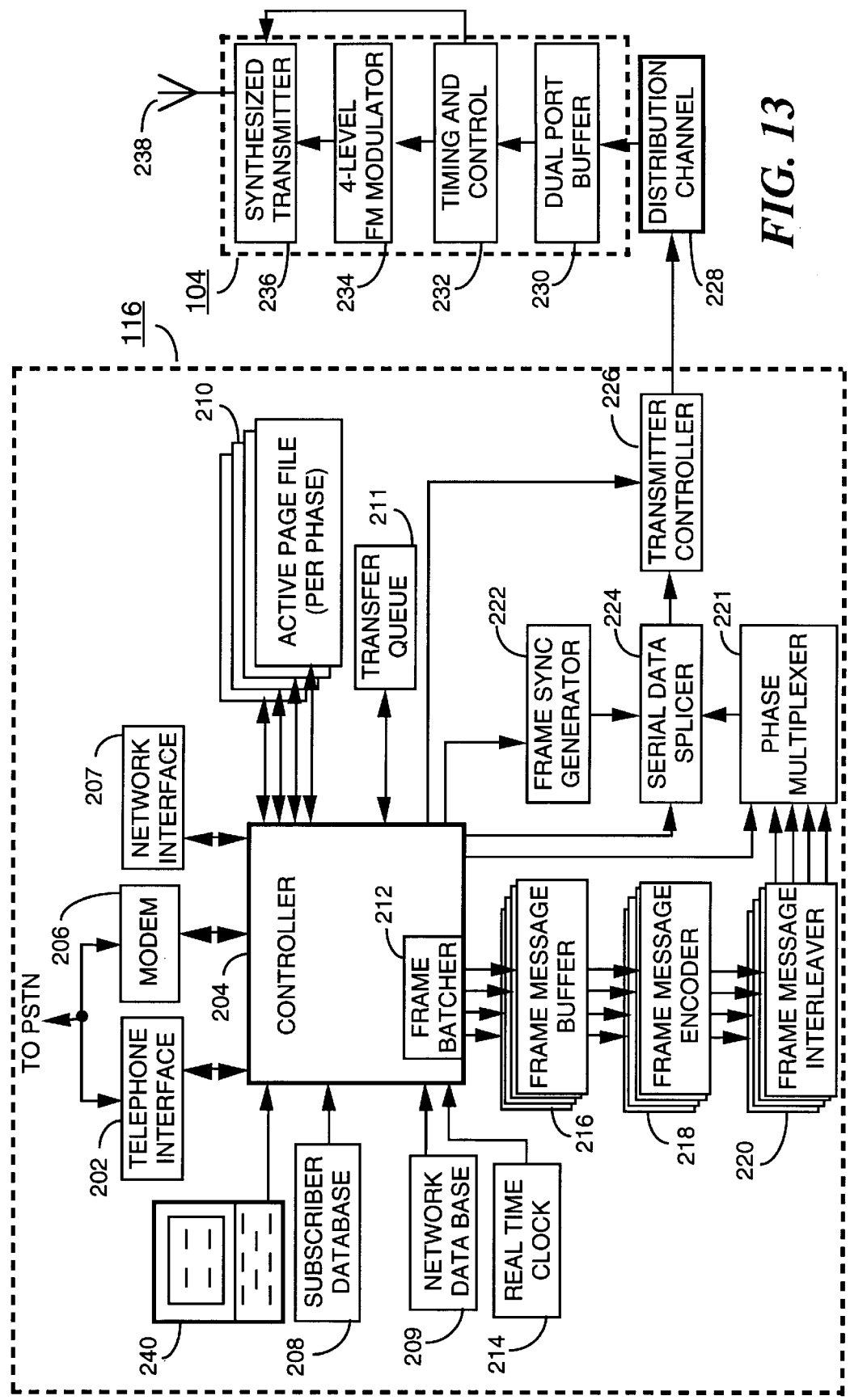
FIG. 13 is an electrical block diagram of a paging terminal in accordance with the present invention.

FIG. 13 is an electrical block diagram of the paging terminal 116 utilized for processing and controlling the transmission of messages within the local geographic area, and further for forwarding messages to alternate local geographic areas where the receiving device is roaming in accordance with the present invention. Tone-only and numeric messages which can be readily entered using a Touch-Tone telephone are coupled to the paging terminal 116 through a telephone interface 202 in a manner well known in the art. Longer messages, such as alphanumeric messages which require the use of a data entry device are coupled to the paging terminal 116 through a modem 206 using any of a number of well known modem transmission protocols. When a call to place a message is received, a controller 204 handles the processing of the message. The controller 204 is preferably a microcomputer, such as an MC68000 or equivalent, which is manufactured by Motorola Inc., and which runs various pre-programmed routines for controlling such terminal operations as voice prompts to direct the caller to enter the message, or the handshaking protocol to enable reception of messages from a data entry device. When a call is received, the controller 204 references information stored in a subscriber database 208 to determine how the message being received is to be processed.

Referring to FIG. 14, the subscriber data base 208 includes, but is not limited to such information as the addresses assigned to the receiving device 126, including both individual addresses 1202 and group addresses 1204, and the corresponding local personal access numbers 1206 and local group access numbers 1208; the message type 1210 associated with each address, such as tone only, numeric, alphanumeric or voice; and information related to the status 1212 of the receiving device, such as whether the receiving device is active or inactive for failure to pay a bill. In accordance with the present invention, the subscriber data base 208 also stores information related to the control of messages when a receiving device is roaming, such as a roaming traffic flag 1218 indicating the receiving device is roaming, one or more roaming addresses 1214 assigned to the receiving device; transmission attributes 1216 assigned to the receiving device 126 in the home system, such as a home frame identifier FRx identifying to which home frame the receiving device is assigned, a transmission phase identifier Øx identifying to which transmission phase the receiving device is assigned, a collapse cycle value Cx which indicates to what other frames the receiving device will also respond, and a roaming traffic flag TFx; and identification of the alternate local service area, i.e. the network ID 1220, in which the receiving device is roaming. It is important to note that the traffic flag TFx varies as a function of the assigned address 1202, and that only the transmission attributes of the primary address, typically address 1, will be used to control the reception of all addresses when the receiving device is roaming, as will be described in detail below.

When a call is received, and the receiving device to which the message is directed is roaming, the controller 204 also references information stored in a network database 209 to determine to which alternate local area system the message is to be forwarded. Also referring to FIG. 14, the network data base 209 includes, but is not limited to such information as the alternate local system name 1222, if different from that of the home system; the roaming receiving device location 1224, the roaming address type 1226, either coordinated or non-coordinated; the alternate local system ID 1220 and the TNPP address 1228 which is used to direct the messages to the alternate local system in which the roaming receiving device is located.

Returning to FIG. 13, a data entry terminal 240 is provided which couples to the controller 204, and which is used for such purposes as entry, updating and deleting of subscriber information stored in the subscriber data base 208, for entry, updating and deleting of network information stored in the network database 209, for monitoring system performance, and for obtaining such information as subscriber billing information.

Returning to FIG. 13, the received message is stored either in an active page file 210 which stores the messages in queues according to the transmission phase assigned to the receiving device 126 or in a transfer queue 211, depending upon whether the receiving device is determined to be at home or roaming, as will be described in further detail below. In the preferred embodiment of the present invention, four phase queues are provided in the active page file 210. The active page file 210 is preferably a dual port, first in first out random access memory, although it will be appreciated that other random access memory devices, such as hard disk drives, can be utilized as well. Periodically the message information stored in each of the phase queues is recovered from the active page file 210 under control of controller 204 using timing information such as provided by a real time clock 214, or other suitable timing source. The recovered message information from each phase queue is sorted by frame number and is then organized by address, message information, and any other information required for transmission, and then batched into frames based upon message size by frame batching controller 212. The batched frame information for each phase queue is coupled to frame message buffers 216 which temporarily store the batched frame information until a time for further processing and transmission. Frames are batched in numeric sequence, so that while a current frame is being transmitted, the next frame to be transmitted is in the frame message buffer 216, and the next frame thereafter is being retrieved and batched. At the appropriate time, the batched frame information stored in the frame message buffer 216 is transferred to the frame encoder 218, again maintaining the phase queue relationship. The frame encoder 218 encodes the address and message information into address and message code words required for transmission, as will be described below. The encoded address and message code words are ordered into blocks and then coupled to a block interleaver 220 which interleaves preferably eight code words at a time for transmission in a manner well known in the art. The interleaved code words from each block interleaver 220 are then serially transferred to a phase multiplexer 221, which multiplexes the message information on a bit by bit basis into a serial data stream by transmission phase. The controller 204 next enables a frame sync generator 222 which generates the synchronization code which is transmitted at the start of each frame transmission. The synchronization code is multiplexed with address and message information under the control of controller 204 by serial data splicer 224, and generates therefrom a message stream which is properly formatted for transmission. The message stream is next coupled to a transmitter controller 226, which under the control of controller 204 transmits the message stream over a distribution channel 228. The distribution channel 228 may be any of a number of well known distribution channel types, such as wire line, an RF or microwave distribution channel, or a satellite distribution link. The distributed message stream is transferred to one or more transmitter stations 104, depending upon the size of the communication system. The message stream is first transferred into a dual port buffer 230 which temporarily stores the message stream prior to transmission. At an appropriate time determined by timing and control circuit 232, the message stream is recovered from the dual port buffer 230 and coupled to the input of preferably a 4-level FSK modulator 234. The modulated message stream is then coupled to the transmitter 236 for transmission via antenna 238. The transmitter 236 is synthesized, thereby allowing multi-frequency operation, when needed, which is controlled by the timing and control circuit 232.

FIG. 14 is a diagram depicting a subscriber data base 208 and a network data base 209 in accordance with the present invention. The subscriber data base 208 includes by way of example user identification (user/user name), local personal access numbers 1206, personal addresses 1202, local group access numbers 1208, group addresses 1204, receiving device types 1210, an active/inactive flag 1212, a roaming address 1214, transmission attributes 1216, the roaming flag 1218 and an alternate network ID 1220. The subscriber database 208 maintains a record of the personal addresses 1202 and group addresses 1204 assigned to each receiving device. Messages which are received on local personal access numbers 1206 or local group access numbers 1208 are directed to the appropriate receiving device via the personal address 1202 and group addresses 1204 associated to the local personal access numbers 1206 or local group access numbers 1208, respectively. Associated with each address is the message type 1210, such as tone only, numeric, alphanumeric or voice. Also associated with each receiving device is the active/inactive flag 1212 which indicates whether the receiving device is current in paying the monthly service fees. A number of transmission attributes 1216 are associated with each receiving device, such as the Home Frame, FRx; the phase, Øx, the collapse value, Cx and a roaming traffic flag TFx. When the receiving device is identified as roaming, the alternate network ID 1220 identifies the local area system in which the receiving device is located.

As shown in FIG. 14, a receiving device can be assigned a single address or multiple addresses and can also be assigned a group address or addresses. It is the conversion of these addresses within the Home system to one or more addresses in the local area system in which the receiving device is roaming which enables the receiving device to flexibly roam between many local area systems, as will be described below.

The network database 209 stores such information as a system name 1222, a location 1224, an address type 1226, the network ID 1220 and a TNPP address 1228. The system name 1222 and location 1224 are used to identify in which local area system the receiving device is roaming. The address type 1226 indicates whether the home address are coordinated (C0, or non-coordinated (NON-C) with the addresses within the local area system the receiving device is roaming. The TNPP address is utilized to properly route any messages to the local area system in which the receiving device is located.

It will be appreciated that other information can be stored in the subscriber database 208 and the network database 209 as well.

Figure 15:
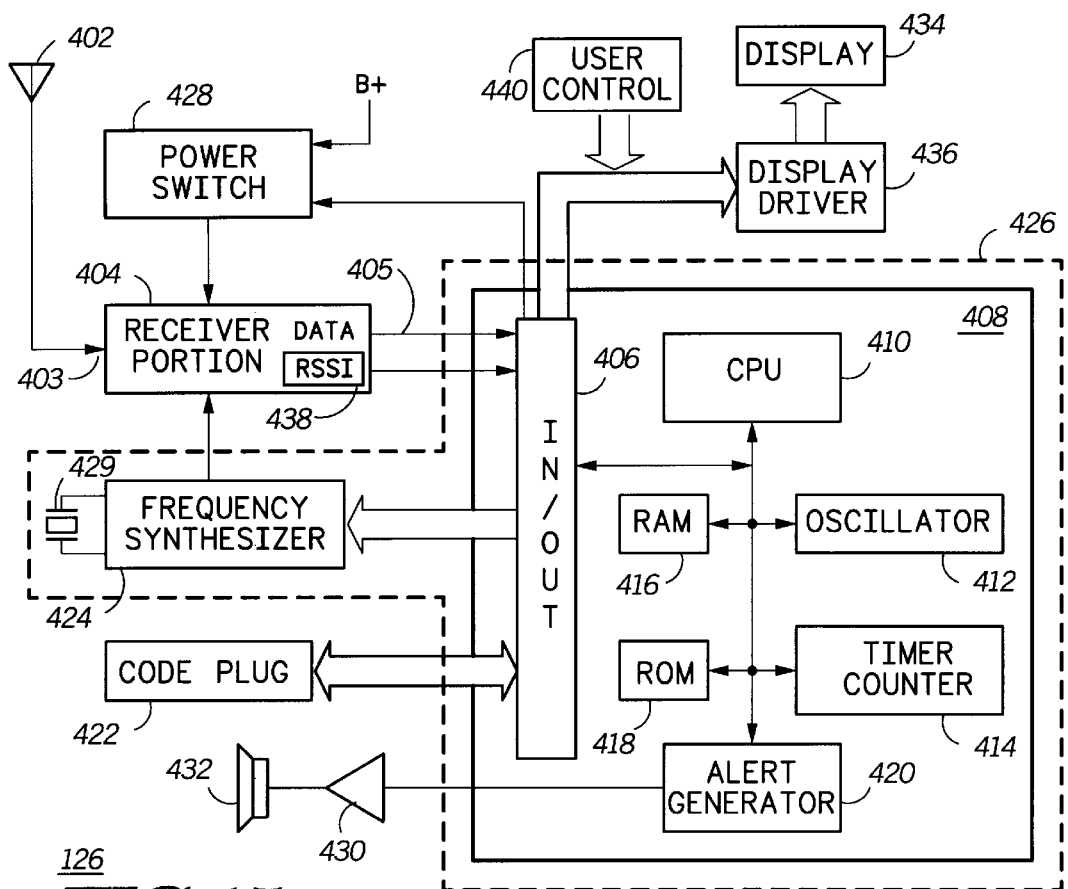
FIG. 15 is an electrical block diagram of a receiving device in accordance with the present invention.

FIG. 15 shows an exemplary electrical block diagram of a receiving device 126, such as a communication receiver, and particularly a selective call receiver, according to the present invention. Coded message signals transmitted are received by an antenna 402 which couples to the input 403 of the receiver portion 404. The receiver portion 404 preferably is an FM receiver. The received coded message signals are processed by receiver portion 404 in a manner well known in the art, and provided at the output 405 as a stream of binary information. The output 405 couples to the input/output (I/O) port 406 of the microcomputer 408. Receiver portion 404 optionally includes received signal strength indicating (RSSI) means 438 which also connects to the I/O port 406 of the microcomputer 408.

Microcomputer 408, which is embodied, for example, by a Motorola MC68HC05 series microcomputer, performs a variety of functions, including decoding the binary information. Microcomputer 408 includes a central processor unit (CPU) 410, oscillator 412, timer counter 414, random access memory (RAM) 416, read only memory (ROM) 418 and alert tone generator 420. CPU 410 controls the operation of the communication receiver 400 and processes the received coded message signals. Oscillator 412 provides the clock for the operation of the CPU 410, and provides the reference clock for timer counter 414. The oscillator 412 is controlled by a crystal, not shown in the diagram. The assigned transmission slot or transmission phase, channel identification information, one or more personal addresses, one or more group addresses when assigned and a primary roaming address when assigned are stored in code plug 422, which functions as a code memory and which is a programmable read only memory, such as an electrically erasable programmable read only memory (EPROM). In addition, the SSID information and NID information is also stored in the code plug 422. The RAM 416 is used to store code plug information when the communication receiver 400 is initially turned on, and to store messages as they are received. ROM 418 contains the firmware which controls the microcomputer operation. The firmware includes such programs as for controlling the decoding of transmission slot identity information, channel identification information, receiver address, receiver scanning frequency lists, NID information, SSID information, and other receiver functions. Alert generator 420 generates an audible alert signal upon reception of a message.

When the receiving device 126 is initially turned on, the microcomputer 408 functions as a synchronization means, enabling the receiving device 126 to synchronize to the assigned transmission slot, after the receiving device detects information in frame 0. Microcomputer 408 also functions as the decoder for decoding channel identification information, LID information, NID information and pager address information. Microcomputer 408, in conjunction with frequency synthesizer 424 and crystal 429, functions as a channel selecting means 426 used to control the scanning of the receiving device 126. Microcomputer 408, in conjunction with power switch 428, provides a battery saving function for the receiver portion 404. User control 440, including, for example, well-known switches and buttons, provide for control of the receiving device by the subscriber.

Figure 16:
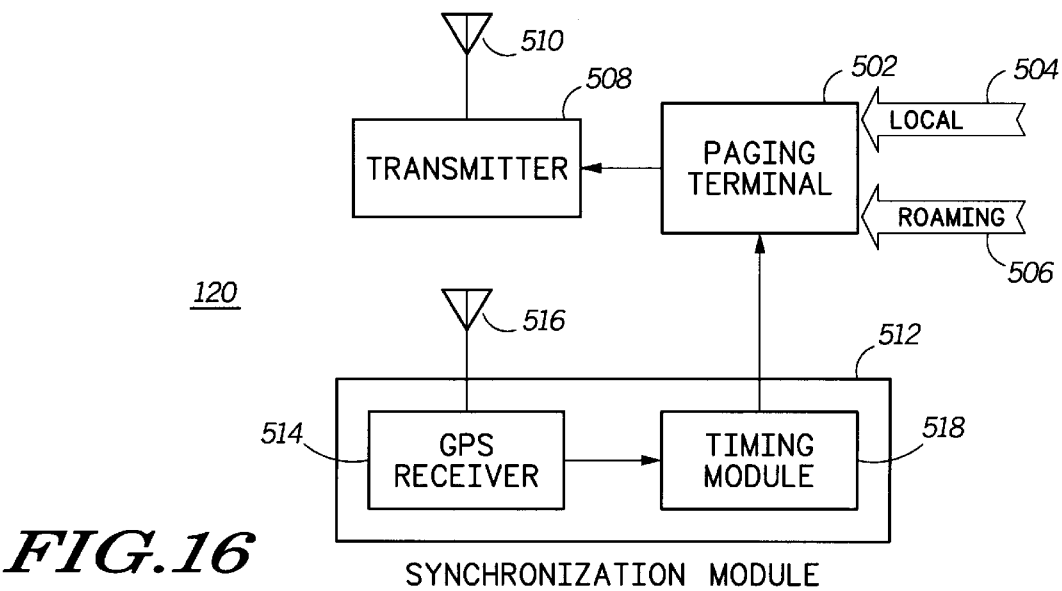
FIG. 16 is a electrical block diagram illustrating a transmitter station in accordance with the present invention

FIG. 16 illustrates an example of a transmitter station 120 useful in accordance with the present invention. Transmitter station 120 comprises a paging terminal 502 used to enter messages originated in a home or local area with respect to a receiving device, as indicated at 504, or the messages are for a receiving device that is roaming outside its local area, as indicated at 506. Messages for a roaming receiving device which are originated outside of the coverage area home or local area of a receiving device are conveyed to the paging terminal 502 by a hardwire interconnect with a paging terminal in the home or local area, such as a dial-up or hardwired phone line or data network, or by means of an RF signal, such as a satellite receiver.

Messages entered into paging terminal 502 are processed for transmission into the signaling format or protocol described above or another suitable signaling protocol. The messages are placed in queues corresponding to the frame to which a receiving device is assigned. The output of the paging terminal is coupled to an RF transmitter 508 for transmission via an antenna 510. It is appreciated that the paging terminal 502 optionally controls more than one transmitter, as in a wide area simulcast system as described above, and synchronization of multiple transmitters in a simulcast system is provided. Various methods for synchronizing the transmitters are available, such as described in U.S. Pat. No. 4,718,109 to Breeden et al.

Furthermore, in order to provide for global synchronization of transmitters to frame 0 as described above, a synchronization module 512 is coupled to the paging terminal 502. The synchronization module preferably comprises a global position system (GPS) receiver 514 and a timing module 518, which together enable the paging terminal 502 to determine an accurate occurrence of frame 0. It will be appreciated that alternatively, instead of a GPS receiver 514 and receiving antenna 516, another time standard signal can be monitored by suitable monitoring devices.

Figure 17:
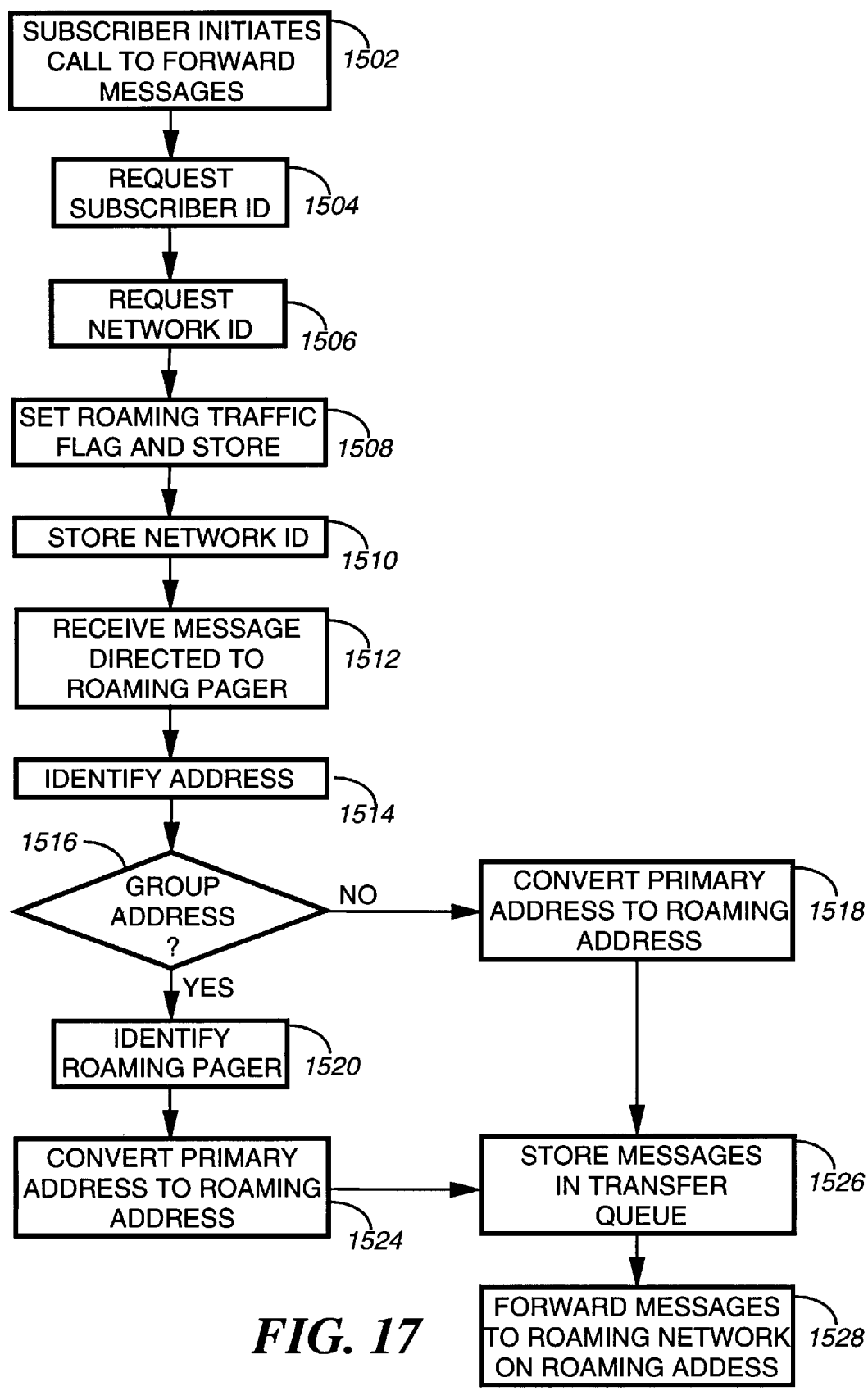
FIG. 17 is a flow chart illustrating the handling of messages to roaming receiving devices in accordance with the present invention.

FIG. 17 is a flow chart illustrating the handling of messages, and in particular group messages, directed to roaming receiving devices in accordance with the present invention. A subscriber initiates a call into the Home system to request forwarding messages to the alternate local service area in which the receiving device will operate, at step 1502. The call can be initiated while the subscriber is within the home service area or is within the alternate local service area. The subscriber is prompted, either by an operator or automatically at step 1504, for the subscriber ID identifying the receiving device, and is further prompted, at step 1506, for the network ID of the paging service within the alternate service area. The network ID can be derived from a transmission in the local area system in which the receiving device is located and which is displayed, can be preprogrammed into the receiving device for display, or can be provided by the local area system operator when contacted to receive messages which are being forwarded. When the subscriber provides the requested information, the roaming traffic flag 1218 is set and stored in the subscriber data base 208, at step 1508, and the network ID 1220 is also stored in the subscriber data base 208, at step 1510. When a message is received which is directed to the roaming receiving device 126, at step 1512, the address is identified, at step 1514 by the controller 204 of the paging terminal 116. When the address identified is determined to be a group address, at step 1516, the subscriber data base 208 is searched to identify the primary address, as described above, of the receiving device which is roaming and which belongs to the group, at step 1520. The primary address of the receiving device which is identified is converted using the information stored within the subscriber data base 208 into the roaming address 1214 of the receiving device 126, at step 1524, and the roaming address and message are stored within the transfer queue, at step 1526. When the address identified is determined to not be a group address, at step 1516, but rather an address assigned to a roaming receiving device 126, the primary address of the receiving device which is identified is also converted using the information stored within the subscriber data base 208 into the roaming address 1214 of the receiving device 126, at step 1524, and the roaming address and message are also stored within the transfer queue, at step 1526. At an appropriate time, the messages stored within the transfer queue 211 are recovered and forwarded to the paging service within the alternate service area. The messages directed to the roaming receiving devices are then accumulated with messages which are directed to local receiving devices, and are processed for transmission as described above.

Figure 18:
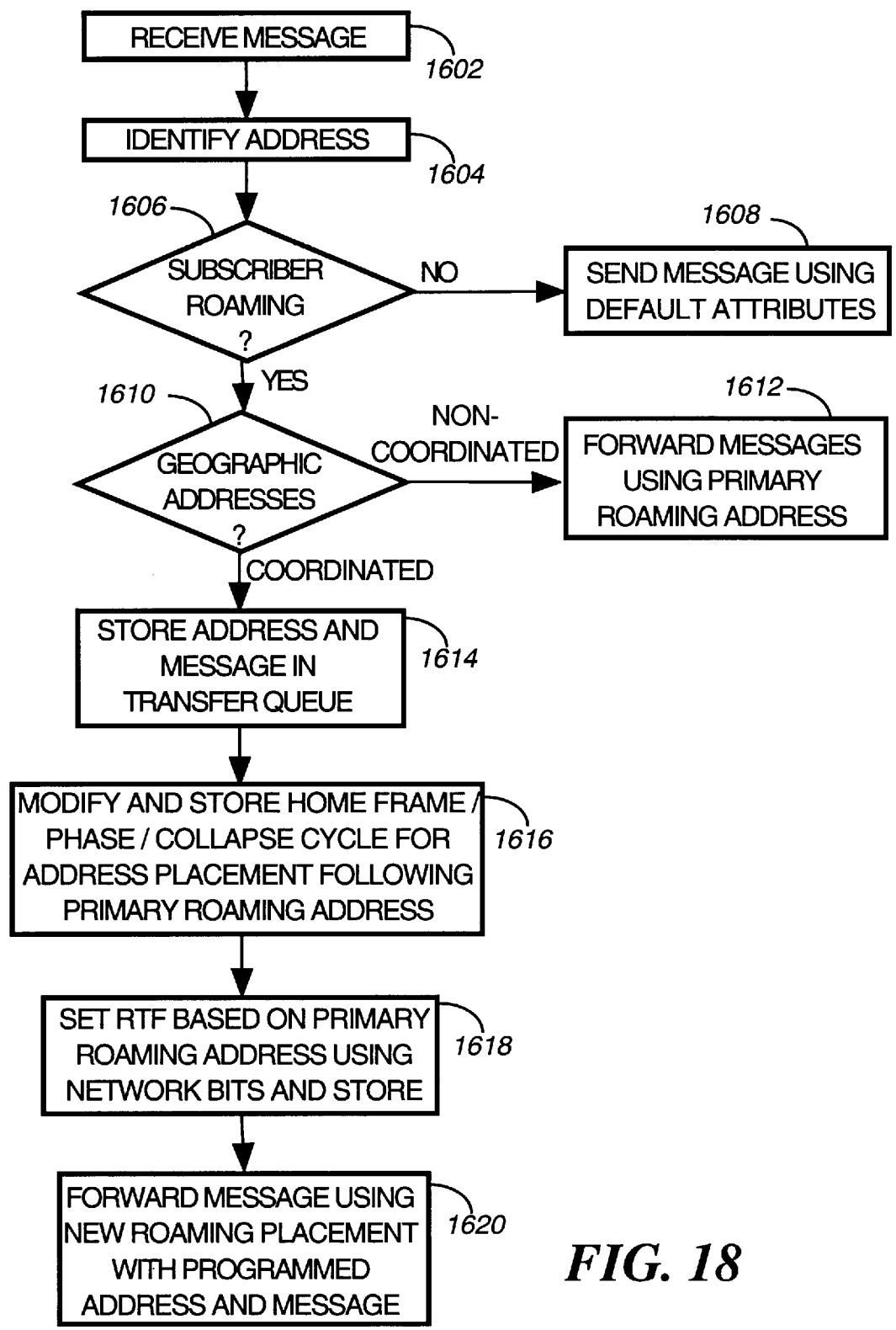
FIG. 18 is a flow chart illustrating the handling of messages in general which are directed to roaming receiving devices in accordance with the present invention.

FIG. 18 is a flow chart illustrating the handling of messages in general which are directed to roaming receiving devices in accordance with the present invention. When a message is received which is directed to the roaming receiving device 126, at step 1602, the address is identified, at step 1604 by the controller 204 of the paging terminal 116. When the address identified is not associated with a receiving device 126 which is roaming, at step 1606, the message is processed by the paging terminal 116, and transmitted to the receiving device 126 using the default transmission attributes, at step 1608. When the address identified is associated with a receiving device 126 which is roaming, at step 1606, the controller accesses the network data base 209 to determine whether the address are coordinated, or are non-coordinated in the alternate local service area. When the addresses are determined to be non-coordinated, at step 1610, the message is forwarded, as described above, to the alternate local service area using the primary roaming address 1214, at step 1612. When the address are determined to be coordinated, at step 1610, the personal address 1202 and the associated message is stored within the transfer queue 211, at step 1614, and the transmission attributes, which include the home frame assignment, the phase assignment, and the collapse cycle are modified for address placement following the transmission attributes designated for the primary roaming address, at step 1616. The roaming traffic flag (RTF) is set to the traffic flag TFx of the primary roaming address using the network bits defined in the extended FLEX™ page type of TNPP version 3.8, and stored in the transfer queue 211, at step 1618. At an appropriate time, the messages stored within the transfer queue 211 are recovered and forwarded to the paging service within the alternate service area, at step 1620. The messages directed to the roaming receiving devices are then accumulated with messages which are directed to local receiving devices, and are processed for transmission as described above.

Figure 19:
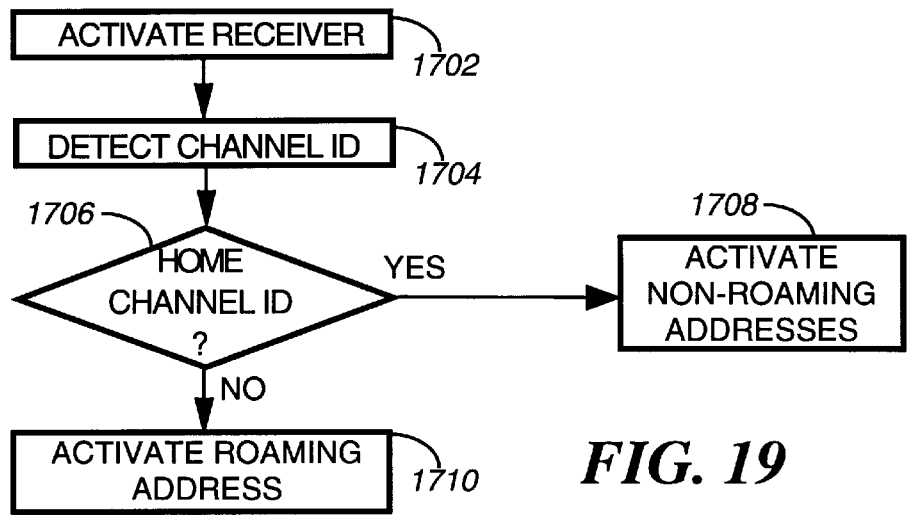
FIG. 19 is a flow chart illustrating the operation of the roaming receiving devices in accordance with the present invention when the address are not coordinated.

FIG. 19 is a flow chart illustrating the operation of the roaming receiving devices in accordance with the present invention when the addresses between local area systems are not coordinated. When the receiving device 126 is activated to receive information transmitted on the channel in the service area in which the receiving device 126 is located, at step 1702, the receiving device 126 detects the transmitted channel ID, at step 1704. When the channel ID detected matches that of the Home channel ID, at step 1706, the microcomputer 426 within the receiving device 126 activates the non-roaming addresses, i.e. the personal addresses and any group addresses, at step 1708, and processing of the received messages is handled in a manner well known to one of ordinary skill in the art. When the channel ID detected does not match that of the Home channel ID, at step 1706, the microcomputer 426 within the receiving device 126 activates the roaming addresses, i.e. either the primary personal address (short address) or the primary roaming address (long address), at step 1710, and processing of the received messages is handled in a manner as described above.

Figure 20:
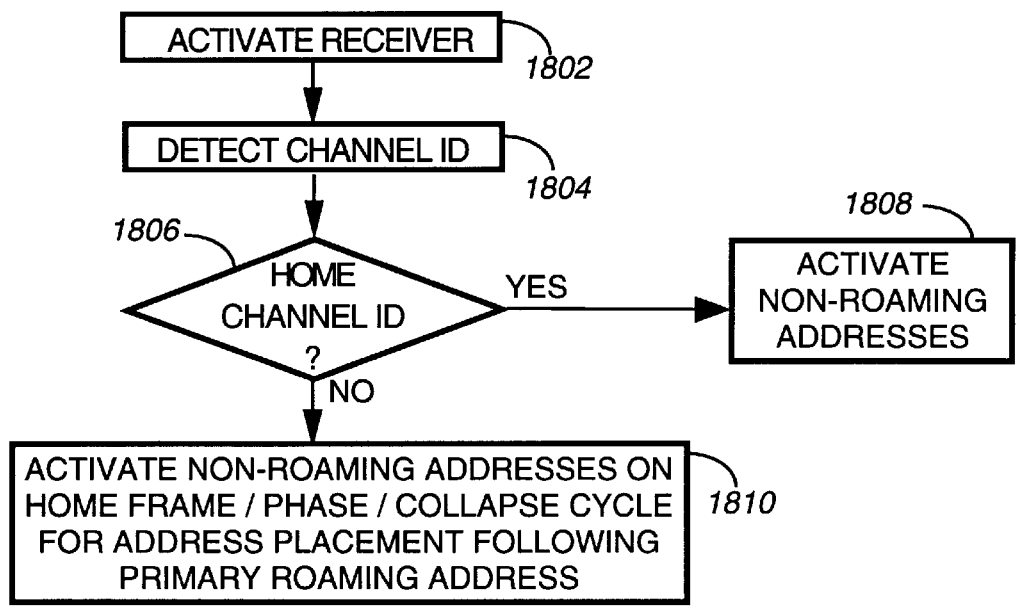
FIG. 20 is a flow chart illustrating the operation of the roaming receiving devices in accordance with the present invention when the address are coordinated.

FIG. 20 is a flow chart illustrating the operation of the roaming receiving devices in accordance with the present invention when the addresses are coordinated. When the receiving device 126 is activated to receive information transmitted on the channel in the service area in which the receiving device 126 is located, at step 1802, the receiving device 126 detects the transmitted channel ID, at step 1804. When the channel ID detected matches that of the home channel ID, at step 1806, the microcomputer 426 within the receiving device 126 activates the non-roaming addresses, i.e. the personal addresses and any group addresses, at step 1808, and processing of the received messages is handled in a manner well known to one of ordinary skill in the art. When the channel ID detected does not match that of the home channel ID, at step 1806, the microcomputer 426 within the receiving device 126 activates the personal address 1202, and the transmission attributes, which include the home frame assignment, the phase assignment, and the collapse cycle are modified for receiving the address following the transmission attributes designated for the primary roaming address, at step 1810, and processing of the received messages is handled in a manner as described above.

It should be appreciated by now that the present invention provides a method and apparatus for providing flexible roaming between local area systems in which the address assignments are coordinated, as well as between local area systems in which the address assignments are uncoordinated. Furthermore, it will be appreciated that a receiving device having any number of personal as well as group addresses can be efficiently addressed in the local area system in which the receiving device is roaming, with only a single address when the local area systems are uncoordinated. Furthermore, it will be appreciated that a receiving device having any number of personal as well as group addresses can be efficiently addressed in the local area system in which the receiving device is roaming when the address assignments are coordinated, by converting the transmission attributes of all assigned addresses to that of a primary address or primary roaming address.

It should be appreciate that the present invention provides a method and apparatus for forwarding messages transmitted in the Home area system on a number of different addresses to the receiving device when roaming, either on a single primary roaming address or on addresses which have been modified to follow the transmission attributes of the primary roaming address. This improves the receiving device battery life and frees up, in a FLEX™ system, FLEX™ frames to be used to inspect other rf channels for messages when operating in coverage overlap areas such as described above.

It should be understood that although the invention has been described in connection with a particular signaling protocol, the invention is useful in connection with any synchronous signaling protocol.

The above description is intended by way of example only and is not intended to limit the present invention in any way except as set forth in the following claims.

What is claimed is:

1. A message transmission system providing flexible roaming capability to
    a receiving device which includes
        a code memory which stores addresses of a first type and an address of a second type to identify the receiving device, the addresses of the first type enable reception of messages associated with each of the addresses of the first type when the receiving device is operating within a local geographic area, and
        the address of the second type enables reception of the messages associated with each of the addresses of the first type when the receiving device is operating within a different geographic area,
    said message transmission system comprising:
        a controller for controlling transmission of the messages associated with each of the addresses of the first type when the receiving device is operating within the local geographic area;
        a transmitter, located within the local geographic area, for transmitting each of the addresses of the first type with messages associated therewith;
        said controller further controls a conversion of each of the addresses of the first type to the address of the second type when the receiving device is operating within the different geographic area, wherein said controller transfers the address of the second type and the messages associated each of the addresses of the first type having messages associated therewith to a transmitter located in the different geographic area in which the receiving device is operating; and
        said transmitter located within the different geographic area in which the receiving device is operating transmits the address of the second type with the messages associated with the addresses of the first type.

2. A method for providing flexible roaming capability to a receiving device
    which is assigned addresses of a first type and an address of a second type, the addresses of the first type enable reception of messages associated with the addresses of the first type when the receiving device is operating within a local geographic area and the address of the second type enables reception of the messages associated with each of the addresses of the first type when the receiving device is operating within a different geographic area, said method comprising the steps of:

transmitting the addresses of the first type with the messages associated therewith to the receiving device when the receiving device is operating within the local geographic area;

converting each of the addresses of the first type with the messages associated therewith to the address of the second type, when the receiving device is operating within the different geographic area;

transferring the address of the second type and the message associated with each of the addresses of the first type which have messages associated therewith to a transmitter located in the different geographic area in which the receiving device is operating; and transmitting the address of the second type with the messages associated with the addresses of the first type having messages associated therewith within the different geographic area in which the receiving device is operating.

3. The method for providing flexible roaming according to claim 2, further comprising the steps of:

designating when the receiving device is operating within the local geographic area; and designating when the receiving device is operating within the different geographic areas.

4. The method for providing flexible roaming according to claim 2, wherein the receiving device operating within the wide geographic area operates on one or more of a plurality of local area radio frequency channels.

5. The method for providing flexible roaming according to claim 4, wherein assignment of the address of the second type is coordinated for one or more of the plurality of local area radio frequency channels.

6. The method for providing flexible roaming according to claim 2, wherein the receiving device operating within the local geographic area operates on a home radio frequency channel.

7. The method for providing flexible roaming according to claim 6, wherein the addresses of the first type have transmission attributes associated therewith for enabling operation of the receiving device on the home radio frequency channel.

8. The method for providing flexible roaming according to claim 7, wherein the address of the second type is associated with a primary roaming address which has transmission attributes associated therewith for enabling operation of the receiving device on one or more of a plurality of local area radio frequency channels.

9. The method for providing flexible roaming according to claim 8, wherein the transmission attributes of the primary roaming address include a home frame identifier, and wherein transmission of the primary roaming address and the messages associated with the addresses of the first type on one or more of a plurality of local area radio frequency channels are responsive to the home frame identifier associated with the primary roaming address.

10. The method for providing flexible roaming according to claim 8, wherein the transmission attributes of the primary roaming address include a transmission phase identifier, and wherein transmission of the primary roaming address and the messages associated with the addresses of the first type on one or more of a plurality of local area radio frequency channels are responsive to the transmission phase identifier associated with the primary roaming address.

11. The method for providing flexible roaming according to claim 8, wherein the transmission attributes of the primary roaming address include a collapse cycle value, and wherein transmission of the primary roaming address and the messages associated with the addresses of the first type on one or more of a plurality of local area radio frequency channels are responsive to the collapse cycle value associated with the primary roaming address.

12. The method for providing flexible roaming according to claim 8, wherein the transmission attributes of the primary roaming address include a roaming traffic flag, and wherein transmission of the primary roaming address and the messages associated with the addresses of the first type on one or more of a plurality of local area radio frequency channels are responsive to the roaming traffic flag associated with the primary roaming address.

13. A message transmission system providing flexible roaming capability to a receiving device which includes a code memory which stores a plurality of addresses, one of which is designated a primary address, the plurality of addresses having transmission attributes associated therewith which enable reception of messages associated with each of the plurality of addresses when the receiving device is operating within a local geographic area, and the primary address enables reception of messages associated with each of the plurality of addresses when the receiving device is operating within different geographic areas;

said message communication system comprising:

a controller, responsive to the transmission attributes associated with each of the plurality of addresses, for controlling transmission of messages associated with the plurality of addresses, when the receiving device is operating within the local geographic area;

a transmitter, located within the local geographic area, for transmitting the messages associated with each of the plurality of addresses;

said controller, being further responsive to the transmission attributes associated with the primary address for controlling a conversion of each of the plurality of addresses having messages associated therewith to the primary address, when the receiving device is operating within a different geographic area, wherein said controller transfers the primary address and the messages associated with each of the plurality of addresses having messages associated therewith to a transmitter located in the different geographic area in which the receiving device is operating; and said transmitter located within the different geographic area in which the receiving device is located transmits the primary address with the messages associated with each of the plurality of addresses having messages associated therewith.

14. A method for providing flexible roaming capability to a receiving device which is assigned a plurality of addresses, one of which is designated a primary address, the plurality of address having transmission attributes associated therewith for enabling reception of messages associated with the plurality of addresses when the receiving device when operating within a local geographic area and the primary address having transmission attributes associated therewith enables reception of the messages associated with each of the plurality of addresses when the receiving device is operating within different geographic areas, said method comprising the steps of:
- controlling, in response to the transmission attributes associated with each of the plurality of addresses, a transmission of each of the plurality of addresses and messages associated therewith to the receiving device when the receiving device is operating within the local geographic area;
- converting each of the plurality of addresses having messages associated therewith to the primary address, when the receiving device is operating within a different geographic area;
- transferring the primary address and the messages associated with each of the plurality of addresses which have messages associated therewith to a transmitter located in the different geographic area in which the receiving device is operating; and
- controlling, in response to the transmission attributes associated with the primary address, a transmission of the primary address with the messages associated with each of the plurality of addresses having messages associated therewith within the different geographic area in which the receiving device is operating.

15. The method for providing flexible roaming according to claim 14, wherein the transmission attributes include a home frame identifier, and wherein the transmission of the primary address with the messages associated with each of the plurality of addresses within the different geographic areas is responsive to the home frame identifier associated with the primary address.

16. The method for providing flexible roaming according to claim 14, wherein the transmission attributes include a transmission phase identifier, and wherein the transmission of the primary address with the messages associated with each of the plurality of addresses within the different geographic areas is responsive to the transmission phase identifier associated with the primary address.

17. The method for providing flexible roaming according to claim 14, wherein the transmission attributes include a collapse cycle value, and wherein the transmission of the primary address with each of the messages associated with the plurality of addresses within the different geographic areas are responsive to the collapse cycle value associated with the primary address.

18. The method for providing flexible roaming according to claim 14, wherein the transmission attributes include a roaming traffic flag, and wherein the transmission of the primary address with each of the messages associated with the plurality of addresses within the different geographic areas are responsive to the roaming traffic flag associated with the primary address.

* * * * *

UNITED STATES PATENT AND TRADEMARK OFFICE
CERTIFICATE OF CORRECTION

PATENT NO. : 5,956,640
DATED : 9/21/99
INVENTOR(S) : Eaton et al.

It is certified that error appears in the above-indentified patent and that said Letters Patent is hereby corrected as shown below:

Column 17, line 29, delete "wide" and insert --different--.

Signed and Sealed this

Twelfth Day of December, 2000

Attest:

Q. TODD DICKINSON

*Attesting Officer*    *Director of Patents and Trademarks*